Figure 1:
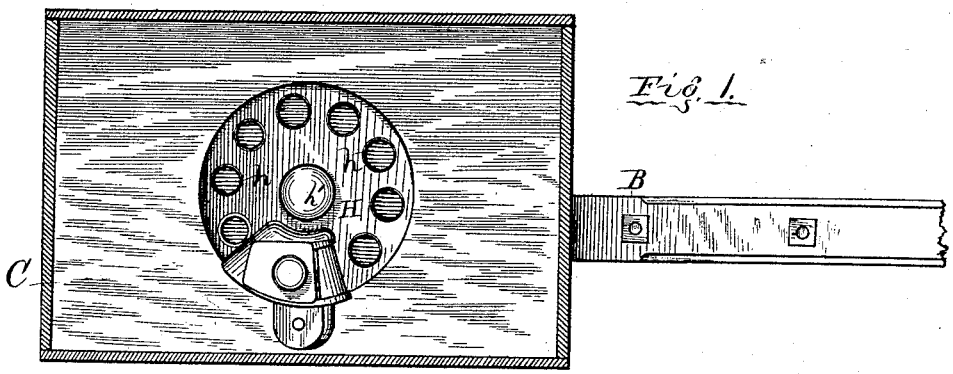

(No Model.) 2 Sheets—Sheet 1.

J. C. BARLOW.
CORN PLANTER.

No. 328,101. Patented Oct. 13, 1885.

Witnesses:
P. R. Richards
J. Johnston

Inventor:
J. C. Barlow
By W. B. Richards
Atty.

N. PETERS, Photo-Lithographer, Washington, D. C.

(No Model.) 2 Sheets—Sheet 2.
J. C. BARLOW.
CORN PLANTER.
No. 328,101. Patented Oct. 13, 1885.
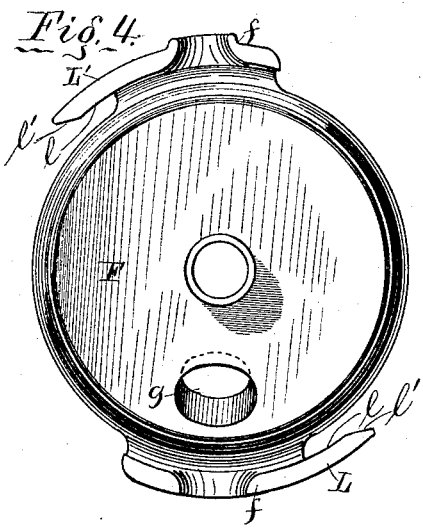
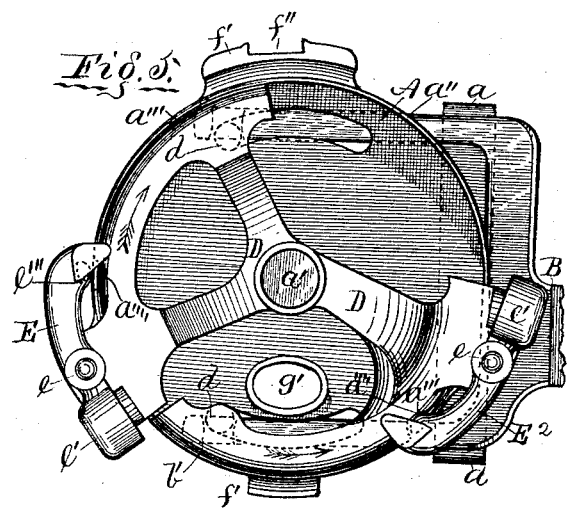
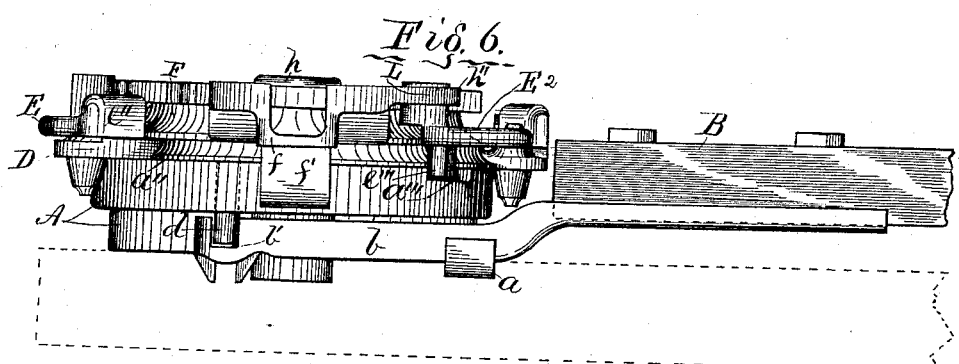
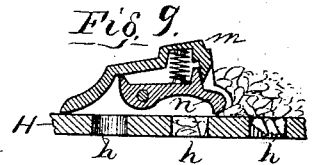
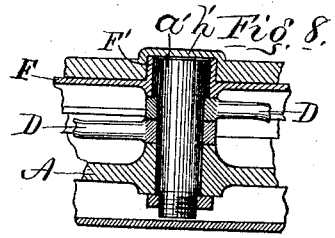
Witnesses:
P. R. Richards.
J. Johnston.
Inventor:
J. C. Barlow,
By W. B. Richards,
Atty.
N. PETERS, Photo-Lithographer, Washington, D. C.

UNITED STATES PATENT OFFICE.

JOSEPH C. BARLOW, OF QUINCY, ILLINOIS.

CORN-PLANTER.

SPECIFICATION forming part of Letters Patent No. 328,101, dated October 13, 1885.

Application filed October 20, 1883. Serial No. 109,591. (No model.)

*To all whom it may concern:*

Be it known that I, JOSEPH C. BARLOW, a citizen of the United States, residing at Quincy, in the county of Adams and State of Illinois, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of corn-planters in which a seed wheel or disk is used, to which an intermittent rotary motion in one direction is given by a reciprocating slide-bar. In this class of planters as generally constructed the sliding bar connects and operates a seed-wheel in each of two seed-boxes; but my invention is applicable to the class of seeding devices in which any number of seed-wheels is used.

In this class of corn-planters as heretofore constructed I have found that by the continuous movement of the seed-cups in one direction the grains of corn will often become slightly wedged between the rear wall of the seed-cups and the plate beneath the seed-wheel, and also sometimes become wedged or lodged beneath the front edge of the cut-off and between the cut-off and seed-wheel, and thus interfere with the free movement of the seed-dropping mechanism.

The first feature of my present invention is designed mainly to relieve the seed-wheel of any interference with its movements from the causes above recited, and to insure the more nearly perfect filling of each seed-cup with seed, and thereby a greater uniformity in the number of grains in each charge of seed measured and dropped; and to the end of providing mechanical means for carrying into effect this first feature of my improvement the invention consists, broadly, in adapting the intermediate mechanism, which transmits motion from the slide-bar to the seed-wheel, to give a slight backward or reverse movement to the seed-wheel immediately before each forward rotary movement of said wheel, whereby the seed-wheel shall have a slight movement in a reverse direction to its regular movement at each forward and at each backward movement of the slide-bar.

The second feature of my invention is designed to exclude dirt or dust of any kind from the seed-wheel journal; and to this end the invention consists in a seed-disk having a socket-seat in its under side for the upper end of the journal on which said wheel rotates, and, further, in providing the fixed plate which rests between the oscillating radial arms, which are shown in the drawings herewith, and the seed-wheel with annular bosses, which extend upward into the socket in the seed-wheel, and thereby exclude dust and dirt from the bearings of said oscillating arms.

The third feature of my invention is designed to use the same pawls which give motion to the seed-wheel in bringing said wheel to rest at proper times; to which end the invention consists in pawls adapted to act alternately on the seed-wheel, each pawl first giving a movement to the seed-wheel, and then arresting its movement and locking it against accidental displacement, all as hereinafter fully described.

In carrying out these several main features of my invention various sub-combinations arise, which are hereinafter fully described.

Figure 2:
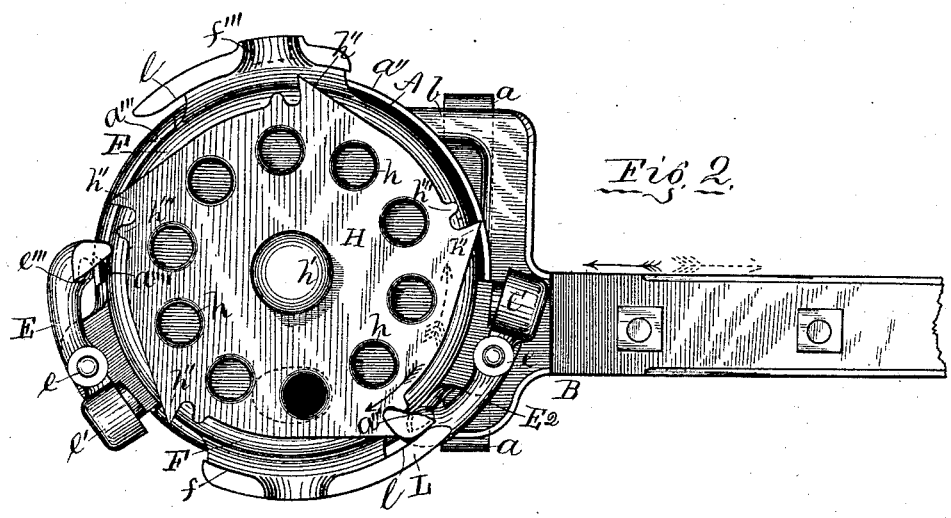
Figure 3:
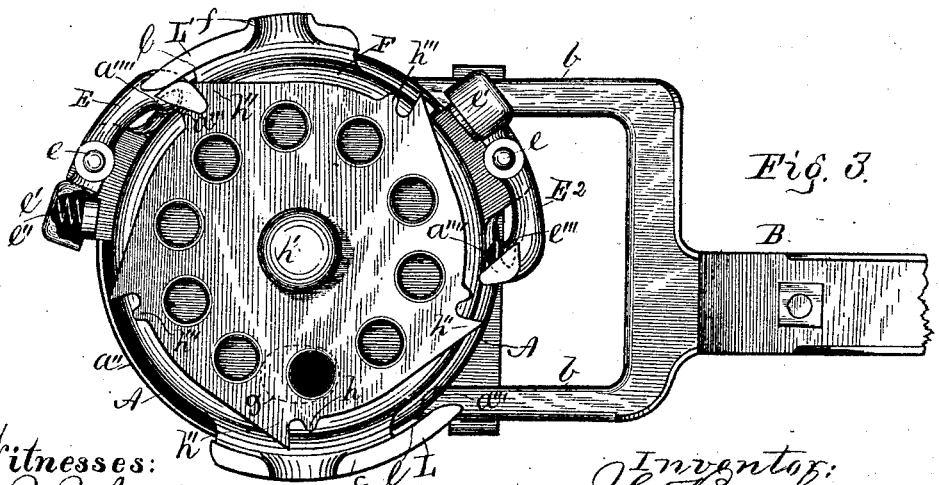

In the accompanying drawings, which show one method of applying my invention, Figure 1 is a top plan of the interior of a corn-planter seed-box; Fig. 2, a top plan of the seed-dropping devices, shown with the cap-plate removed; Fig. 3, same plan as Fig. 2, but the parts in different relative positions from that shown in Fig. 2; Fig. 4, a top plan of the fixed plate between the seed-disk and oscillating radial arms; Fig. 5, a top plan of the parts below the fixed plate. Fig. 6 is a side elevation of the parts shown at Fig. 2. Figs. 7, 8, and 9 are detail sections hereinafter referred to.

Referring to the drawings by letters, the same letter indicating the same part in the different figures—

A represents a fixed bottom plate, provided with suitable ways, *a*, for the slide-bar B, which is beneath the plate A, and connects and operates the seeding devices in two of the seed-boxes C, only one of which is shown. From the bottom plate, A, a central shaft or journal, $a'$, projects upwardly on which the inner ends of radial arms D D are journaled. The outer ends of the radial arms D are arc-shaped and slide on a circular-shaped flange or way, $a''$, which projects upwardly from the bottom A. A pawl, E, is journaled or hinged at $e$ on a projection from the outer end of each arm D. The end $e'$ of each pawl is pressed toward the shaft $a'$ by a spring, $e''$, applied to its other end. The slide-bar B has the ordinary arms $b$ at its ends, which slide beneath the plate A. Each arm $b$ has a transverse groove, $b'$, in its upper side, and a lug, $d$, projects downwardly from each arm D through the plate A, one of which rests in the groove in one arm $b$, and the other in the groove in the other arm $b$, so that a movement of the bar B in one direction will swing the radial arms D in opposite directions, as indicated by the arrows at Fig. 5.

The method herein shown and described of operating the swinging or oscillating arms D is substantially the same as shown in my Patent No. 204,941, of June 18, 1878, except that in this case I connect the arms $b$ with the arms D, as herein described, and not as shown in said patent.

F is a circular plate with lateral projections $f$, which rest on projections $f'$ from the base-plate, A, one of which projections $f'$ has a recess, $f''$, which receives a lug, $f'''$, which projects from the plate F, to hold the plate F in a fixed position relatively to the seed-box and plate A. The plate F has a discharge-opening, $g$, located over the opening $g'$ in the base-plate, which opening $g'$ leads to the throat of the seed-tube. (Not shown.) An annular boss, F', projects upwardly from the plate F, around the upper end of the shaft $a'$, as shown at Fig. 8, which figure is a sectional elevation of parts adjacent to the shaft $a'$. The annular boss F' prevents any dust or dirt which may get between the seed-wheel and plate F from coming in contact with the shaft $a'$.

H is the seed-wheel, provided with the usual complement of seed-cups, $h$. The seed-wheel rests on the plate F, and is centrally journaled on the shaft $a'$, which projects into a socket, $h'$, in the lower side of the seed-wheel. The socket $h'$ forms a cap over the shaft $a'$, as shown at Fig. 8, and prevents any dust or dirt coming in contact with the journal $a'$, as it will do when said journal projects through the seed-wheel. The seed-wheel has the ordinary ratchet-teeth, $h''$, on its periphery. Each tooth $h''$ has the ordinary sloping and the ordinary radial side. A short tooth, $h'''$, projects radially from the periphery of the seed-wheel a short distance from the radial side of each tooth $h''$.

A cam-lug, L, projects from one projection $f$, and a similar lug, L', from the other projection $f$. Each lug L L' has a cam-face, $l$, parallel or nearly parallel with the periphery of the seed-wheel and a short distance exterior to the circular path of the points of the teeth $h''$, and each lug L L' has a cam-face, $l'$, which is a continuation of the face $l$, and inclines outwardly from the seed-wheel toward the outer end of said face $l'$, as shown at Figs. 2 and 3. The flange $a''$ has a recess, $a'''$, nearly below each cam-lug L L'. The arc-shaped outer end of each arm D has a recess, $a''''$, in its outer side. A lug, $e'''$, projects downwardly from the end $e'$ of each pawl E.

It is not necessary to particularly describe herein the action of the pawls in giving an intermittent rotary motion to the seed-wheel H, as the slide-bar B is moved endwise back and forth, and thereby swings the arms D back and forth simultaneously, but in opposite directions, as such action of these parts is substantially the same as shown and described in my aforesaid patent, except as hereinafter described.

At Fig. 2 the slide-bar B is shown as having completed its throw in the direction of the full-line straight arrow at same figure, and thereby given a movement to the seed-wheel in the direction of the curved full-line arrow, and in completing this throw the pawl E, which I have distinguished in the drawings by a figure, 2, after it, was forced by contact with the cam-face $l$ into the space between the tooth $h''$ and the tooth $h'''$, and brought the seed-wheel to a rest with one of the seed-cups beneath the cut-off $m$, and registering with the discharge-openings. When the pawl $E^2$ was forced inward toward the seed-wheel, as last described, its lug $e'''$ entered the recesses $a'''$ $a''''$, which were at the time coincident with each other and with said lug. When the throw of the slide-bar last described was completed, the pawl E was brought into the position shown at same figure—that is, a short distance from the teeth $h''$ $h'''$—and its lug $e'''$, sliding on the flange $a''$, forced the end of the pawl E outward exterior to the outer end of the tooth $h'''$, but not exterior to the tooth $h''$. Now, as the slide-bar is given a throw in the direction of the dot-line arrow thereon, the pawl $E^2$ will engage with the tooth $h'''$ adjacent to it, and give the seed-wheel a slight reverse movement in the direction of the curved dot-line arrow thereon. This reverse movement or back action of the seed-wheel will be limited by the pawl E coming in contact with the tooth $h''$ in front of it, at which instant the pawl $E^2$ has been retracted or pushed outward exterior to the end of the tooth $h'''$ with which it was last in contact, by means of the lug $e'''$ on said pawl coming in contact with the flange $a''$ as the pawl was drawn backward. This outward movement of the pawl $E^2$ frees it then of the seed-wheel, and permits the pawl E to give a movement to the seed-wheel in the direction of the full-line curved arrow and bring the parts into relative positions shown at Fig. 3. Thus it will be seen that the movement of the slide-bar in either direction gives to the seed-wheel first a slight reverse movement, and then a full direct movement in an opposite direction, or, in other words, a mixed oscillating and intermittent rotary motion.

As a seed-wheel moves in one direction only (shown by the arrow at Fig. 7) the seed will tend to wedge between the rear side of the seed-cup and the plate beneath said cups, and a slight reverse movement of the seed-wheel will release the wedged parts in the evident manner.

When the seed-wheel moves in only one direction, seed will sometimes remain partially beneath the edge of the cut-off, as shown at Fig. 9, and the reverse movement of the seed-wheel will also remove these interferences with a free movement of said seed-wheel. The reverse movement or back action of the seed-wheel will also tend to settle the grains of corn in the seed-cups, and thus insure greater uniformity in the charges of seed dropped for each hill of corn.

The cam-faces $l$ and $l'$ may be dispensed with, as the spring will ordinarily force the pawl into the seed-plate at the proper time; but to insure this movement of the pawl I prefer to use the cam-face $l$, and the cam-face $l'$ serves as a guard to prevent the pawls flying back too far when the slide-bar is moved with much velocity. It will be evident, also, to any one skilled in the operation of corn-planters that the special features of construction which I have shown and described herein may be changed and varied greatly; hence I do not limit my claims to these special constructions, nor to combinations of special constructions; but

What I claim as new, and desire to secure by Letters Patent, is—

1. In combination with a seed-wheel, a slide-bar adapted to oscillate radial bars simultaneously and in opposite directions, which radial bars carry each a pawl adapted to coact with and give a slight reverse movement and a forward full movement to the seed-wheel at each throw of the slide-bar in either direction, substantially as and for the purpose specified.

2. In a corn-planter, a seed-wheel having a slight reverse movement preceding each of its direct movements, substantially as and for the purpose specified.

3. The combination, with a seed-wheel, of radial arms D, provided with pawls adapted to give a slight reverse movement to the seed-wheel preceding each direct movement thereof, substantially as and for the purpose specified.

4. The combination, with a seed-wheel having teeth $h''\ h'''$, of radial arms having pawls adapted to engage with said teeth, to give a slight reverse movement to the seed-wheel preceding each direct movement, substantially as and for the purpose specified.

5. The combination, with a seed-wheel having teeth $h''\ h'''$ and radial arms having pawls E, of cams $l$, adapted to force said pawls into contact with the seed-plate, substantially as and for the purpose specified.

6. The combination, with a seed-wheel having teeth $h''\ h'''$ and oscillating radial arms provided with spring-pawls E, of cams $l$, adapted to force the pawls into contact with the seed-wheel, and flange $a''$, adapted to force said pawls outwardly, substantially as and for the purpose specified.

7. The combination, with a seed-wheel having teeth $h''\ h'''$ and oscillating radial arms provided with spring-pawls E, of cams $l$, flange $a''$, and a slide-bar adapted to swing the radial arms, substantially as and for the purpose specified.

8. In combination with the seed-wheel and arms D, having pawls E, the slide-bar having arms $b$, each with a horizontal groove which receives a stud projecting from one of said arms D, substantially as and for the purpose specified.

9. In a corn-planter, in combination with the bottom plate having a journal-shaft, $a'$, the fixed plate F, having a boss, F', adapted to act as a dust-excluder, substantially as and for the purpose specified.

10. In combination with the slide-bar, oscillating arms, fixed plate F, and shaft $a'$, the seed-wheel having a socket in its lower side, which extends only partly through the seed-wheel, adapted to receive the shaft $a'$, substantially as and for the purpose specified.

11. In a corn-planter, the combination of a seed-wheel, a slide-bar adapted to oscillate arms, each with a pawl hinged thereto, which pawls act alternately on the seed-wheel to give it an intermittent rotary motion, and a cam adapted to force each pawl after it has acted on the seed-wheel into contact with said seed-wheel for the purpose of arresting its movement and locking or holding it in position until the next succeeding movement of the slide-bar, for the purpose specified.

12. In a corn-planter, the combination of a seed-wheel, oscillating arms carrying pawls, and a cam adapted to force each pawl into contact with the seed-wheel at the termination of the movement given thereto by such pawl, substantially as and for the purpose specified.

13. In a corn-planter, the combination of a seed-wheel, oscillating arms, and pawls hinged to said oscillating arms, which pawls each act, first, to give a movement to the seed-wheel, and then to arrest its movement and hold it in position, substantially as and for the purpose specified.

14. In a seed-dropper, the combination of a seed-wheel and a pawl adapted to give the seed-wheel a slight backward movement preceding each of its forward movements, substantially as and for the purpose specified.

15. In a seed-dropper, the combination of a seed-wheel having two sets of projections or teeth and a pawl adapted to coact with one set of said teeth to move the seed-wheel, and with the other set to arrest its motion, substantially as and for purpose specified.

In testimony whereof I affix my signature in presence of two witnesses.

JOSEPH C. BARLOW.

Witnesses:
CHAS. SEEGER,
G. A. GOODMAN.